June 10, 1924.　　　　V. M. COOPER　　　　1,497,069
TRAILER TRUCK
Filed Nov. 20, 1920　　　4 Sheets-Sheet 1

Witness　　　　　　　　　　Inventor
V. M. COOPER
By
Attorneys

Patented June 10, 1924.

1,497,069

UNITED STATES PATENT OFFICE.

VERNON MERRY COOPER, OF ATLANTA, GEORGIA.

TRAILER TRUCK.

Application filed November 20, 1920. Serial No. 425,459.

*To all whom it may concern:*

Be it known that I, VERNON M. COOPER, a citizen of the United States, residing at Atlanta, in the county of Fulton and State of Georgia, have invented a new and useful Trailer Truck, of which the following is a specification.

This invention relates to trailer trucks, and it is the primary object of the invention to provide a truck of this character having novel steering means, whereby the front and rear wheels thereof will be automatically guided to follow the tracks of the machine or motor vehicle to which the trailer truck is coupled.

A further object of the invention is to provide an equalizing means providing a part of the connection between the front and rear wheels of the truck, thus relieving the truck, and more particularly the running gear thereof of all lateral strain and insuring against whipping of the truck with relation to the vehicle towing the same, and tending to eliminate any possibility of a truck running out of a true trailing line.

A still further object of the invention is to provide a novel form of truck body to efficiently brace the same to prevent the side rails of the frame from moving out of alignment with each other.

Another object of the invention is the provision of a coupling for coupling a plurality of trailer trucks, the coupling being such as will eliminate any possibility of the steering motion being transmitted direct from the steering mechanism on first truck, to the remaining trucks intrain, when the first truck of the train has moved out of the direct path of travel of the trucks, thus insuring accurate trailing and eliminating the power necessary to transmit steering motion to all trailers intrain when all the running gears are connected as a unit.

Another object of the invention is to provide a casting or unit header to be employed at one end of the truck, the header combining stake pockets, coupler lugs, tie lugs for chassis members, bearing supports for rollers, and supports for a wooden floor not shown.

Referring to the drawings:—

Figure 1:
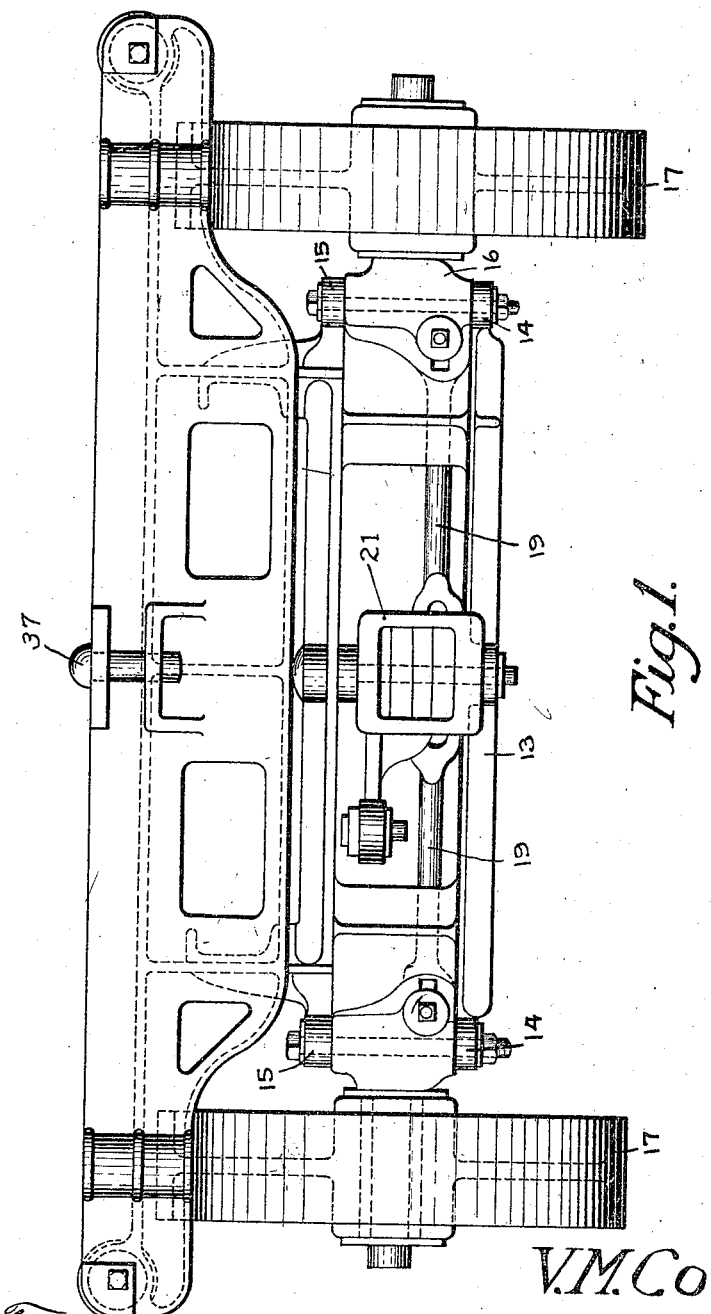
Figure 1 is an end elevational view of a truck.

Referring to the drawings in detail, the reference character 5 designates one of the end rails or header of the truck, it being understood that the structure shown in the present drawings, includes one end of the truck, the structure at the opposite end of the truck being identical with that shown in the present drawings.

The truck also includes intermediate bars 6 which have connection with the end bars through the medium of the longitudinally extending bars 7, which are disposed in suitable spaced relation with each other transversely of the frame of the structure. Connecting rods 8 connect the extreme ends of the bars 6 and rails 5, the rod passing through suitable openings provided in the end rails 5, there being provided suitable nuts indicated at 9, for securing the rods 8 to the end rails 5. The rods 8 also pass through the eye bolts 10, carried by the bars 6 for securing the rods 8 thereto.

These rods 8 clamp the end pieces 5 together by pulling them against the bars 7, and as shown, these rods 8 support the tubular members 11 which are of lengths to permit the tubular members to revolve thereon, facilitating the easy loading of the body.

The supporting axles for the truck are relatively long and have connection with the bars 7 as at 12, and as shown, the ends of the axles 13 are forked to provide opposed arms 14 and 15 providing bearings for the stub shafts 16 which support the respective wheels 17.

The stub shafts 16 have connection with the connecting arms 18, at one of the ends thereof, the opposite ends of the arms 18 having pivotal connection with the controlling arms 19, as at 20, the opposite ends of the arms 19 having pivotal connection with the head 21, as at 22′, so that pivotal movement of the head 21 will cause a relative movement of the arms 18 and 19 to move the wheels 17 with relation to each other.

Figure 2:
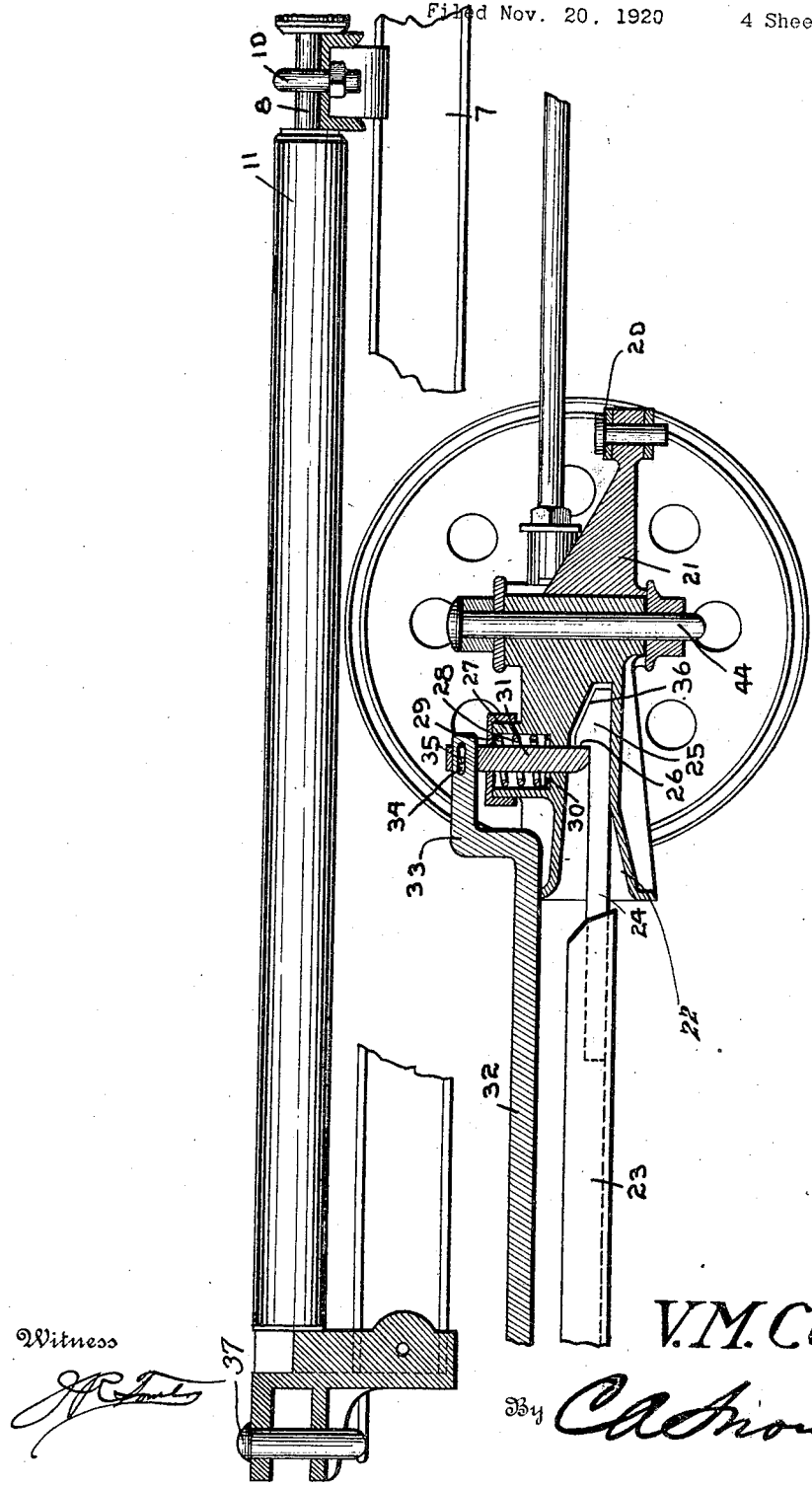
Figure 2 is a fragmental view partly in cross section to illustrate the novel form of coupler.
Figure 3:
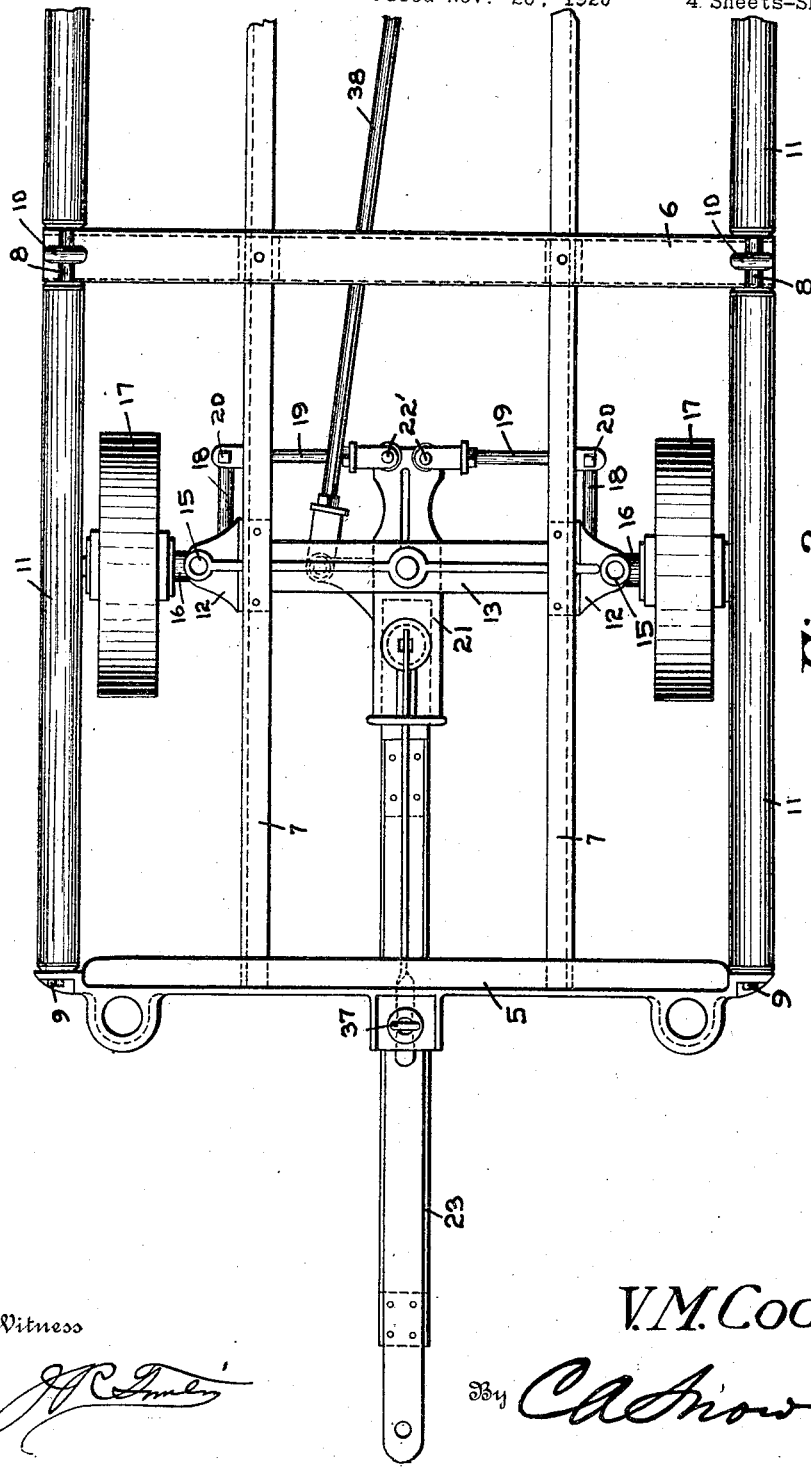
Figure 3 illustrates a fragmental plan view of one end of a trailer truck constructed in accordance with the present invention.
Figure 4:
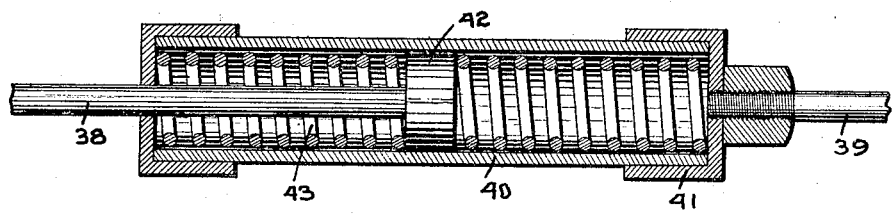
Figure 4 illustrates a longitudinal sectional view through the equalizing device employed in connection with the truck construction.
Figure 5:
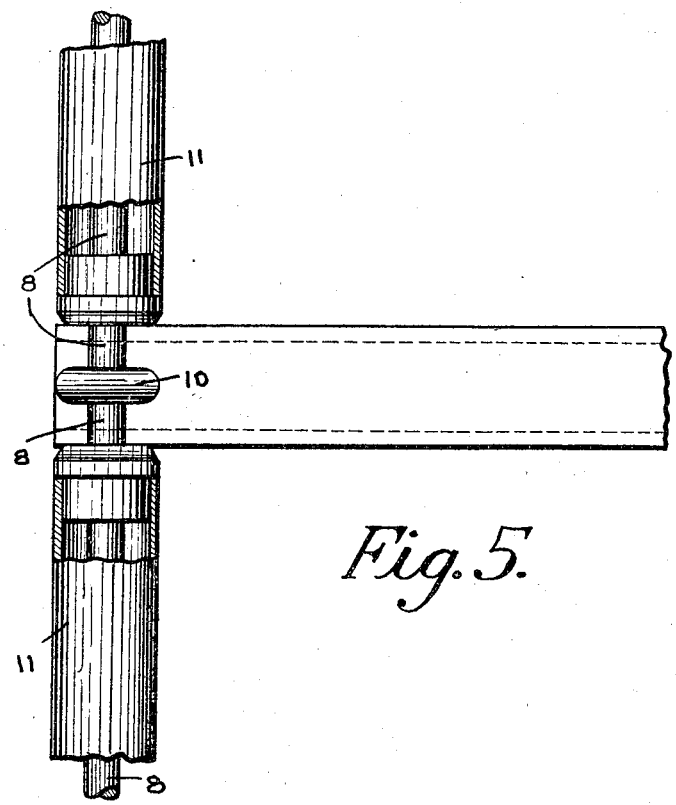
Figure 5 illustrates a fragmental detail view of one of the side rails of the truck.

The head 21 is provided with a forwardly extending hollow portion or socket member 22 forming the socket member of the coupling which is employed for coupling the trailer or truck to the power device or second trailer associated therewith, and as shown by Figure 2 of the drawings, the connecting arm which is indicated by the reference character 23 is provided with a supplemental arm 24, which has a head 25 formed at one end thereof, the head being of a construction to provide a shoulder 26.

A spring housing indicated at 27 is formed integral with the head directly over the socket member 22, and accommodates the coiled spring 28 which has its upper extremity contacting with the inner surface of the cap 29, the opposite end of said coiled spring abutting against the washer 30 which is secured to the locking pin 31, that operates through a suitable opening provided in the base of the spring housing 27, the lower end of said locking pin lying within the path of travel of the head 25 from the socket member, to prevent movement of the head 25, when the pin is in its locking position.

Supporting the pin 31, is a lever 32 which has an offset portion 33 provided with an elongated opening 34 adapted to accommodate the pin 35 carried by the upper extremity of the pin 31, so that movement of the lever 32 results in a vertical movement of the pin 31, to cause the same to move against the tension of the coiled spring 28, to release the head 25 and disconnect the truck from the connecting arm 23. It will be seen that upon releasing the lever 32, the coiled spring 28 forces the pin to its normal position, and since the head 25 is provided with an inclined surface 36, it is obvious that when the head 25 is forced into the socket member, the lower extremity of the locking pin 31 rides over the inclined surface 36 to permit the head 25 to position itself behind the pin.

When trucks are connected, it is pointed out that the connection is made through the bolt 37 which passes through the lever of the preceding truck, so that movement of the forward portion of the lever 23 in one direction results in movement of the head 21 in the same direction to cause the steering of the truck or trailer.

The front and rear wheels of the truck are connected through the medium of the compensating rods 38 and 39, the rod 39 having connection with the housing 40, through the coupling 41, while the rod 38, which is disposed within the housing 40 is provided with the head 42 secured to one extremity thereof and adapted to lie substantially intermediate the ends of the housing 40.

Associated with the head 42 are the coiled springs 43, which have one of their respective ends contacting with the head 42, the opposite ends thereof having connection with the ends of the housing 40, so that movement of the rod 38 and head 42 produces a relative movement of the springs 43 to restrict movement of the head within the housing 40, thus relieving the truck of the strain usually directed thereto, upon the sudden steering of the truck.

It might be further stated that the head 21 has pivotal connection with its supporting axle 13, through the medium of the pivot pin 44, which passes through registering openings provided in the axle and head 21. It is believed that in view of the foregoing disclosure, a detail description step by step as to the operation of the device is unnecessary.

From the foregoing disclosure, however, it is to be understood that the compensating connection between two or more trucks causes the trucks to trail perfectly, eliminating any possibility of whipping of the train under speed, and insures the trailing trucks to follow in a true line, at the same time preventing the trucks from piling, or running out of alignment when moving down grade, in a loaded condition.

What is claimed as new is:—

In a device of the character described, longitudinally extending bars, arranged in spaced relation with each other, transversely extending intermediate bars secured to the first mentioned bars and having their ends extending beyond the parallel bars, end rails having connection with the first mentioned bars and having openings disposed at the ends thereof, eye bolts secured to the transversely extending bars and extending upwardly therefrom, supporting rods having their ends extending through the openings in the end rails, said rods extending through the eyes secured to the intermediate bars, rollers supported on the rods and having their ends disposed between the end rails and intermediate bars to restrict movement of the rollers longitudinally of the rods, the ends of the rollers engaging the transversely extending bars and end rails.

In testimony that I claim the foregoing as my own, I have hereto affixed my signature in the presence of two witnesses.

VERNON MERRY COOPER.

Witnesses:
 PAT M. HILL,
 J. H. STEWART.